(12) United States Patent
Sullivan et al.

(10) Patent No.: US 9,565,454 B2
(45) Date of Patent: Feb. 7, 2017

(54) PICTURE REFERENCING CONTROL FOR VIDEO DECODING USING A GRAPHICS PROCESSOR

(71) Applicant: Microsoft Corporation, Redmond, WA (US)

(72) Inventors: Gary Joseph Sullivan, Bellevue, WA (US); Yongjun Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 13/925,477

(22) Filed: Jun. 24, 2013

(65) Prior Publication Data

US 2014/0376641 A1 Dec. 25, 2014

(51) Int. Cl.
| | |
|---|---|
| H04N 19/88 | (2014.01) |
| H04N 19/105 | (2014.01) |
| H04N 19/172 | (2014.01) |
| H04N 19/44 | (2014.01) |
| H04N 19/587 | (2014.01) |
| H04N 19/577 | (2014.01) |
| H04N 19/162 | (2014.01) |
| H04N 19/426 | (2014.01) |

(52) U.S. Cl.
CPC ............ *H04N 19/88* (2014.11); *H04N 19/105* (2014.11); *H04N 19/172* (2014.11); *H04N 19/44* (2014.11); *H04N 19/577* (2014.11); *H04N 19/587* (2014.11); *H04N 19/162* (2014.11); *H04N 19/427* (2014.11)

(58) Field of Classification Search
CPC .... H04N 19/105; H04N 19/172; H04N 19/88; H04N 19/587; H04N 19/577; H04N 19/44; H04N 19/162; H04N 19/427

USPC ..................................................... 375/240.25
See application file for complete search history.

(56) References Cited

U.S. PATENT DOCUMENTS

| | | | |
|---|---|---|---|
| 6,801,710 B1 | 10/2004 | Halfant | |
| 2005/0078943 A1 | 4/2005 | Kimura | |
| 2010/0135418 A1 | 6/2010 | Zhang et al. | |
| 2010/0246680 A1* | 9/2010 | Tian et al. ............... | 375/240.16 |

(Continued)

FOREIGN PATENT DOCUMENTS

| | | |
|---|---|---|
| EP | 2184919 A2 | 12/2010 |
| EP | 2635025 A1 | 4/2013 |

OTHER PUBLICATIONS

International Searching Authority, U.S. Patent and Trademark Office, International Search Report for PCT/US2013/060236, dated Jan. 29, 2014, 5 pages.

(Continued)

*Primary Examiner* — Francis G Geroleo
(74) *Attorney, Agent, or Firm* — Sunah Lee; Dan Choi; Micky Minhas (57) ABSTRACT

A video decoder obtains a first set of picture buffering parameters associated with a current picture of an encoded video bitstream. The first set of picture buffering parameters identifies a set of one or more reference pictures for use in decoding the current picture by a graphics processor. The video decoder revises the first set of picture buffering parameters into a second (different) set of picture buffering parameters for use in decoding the current picture by the graphics processor. The second set of picture buffering parameters is transferred to the graphics processor for decoding the current picture.

20 Claims, 6 Drawing Sheets

(56) References Cited

U.S. PATENT DOCUMENTS

| | | | |
|---|---|---|---|
| 2011/0013889 A1* | 1/2011 | Wu | H04N 5/783 |
| | | | 386/356 |
| 2012/0106624 A1 | 5/2012 | Huang et al. | |
| 2012/0230397 A1 | 9/2012 | Ouedraogo et al. | |
| 2012/0230423 A1 | 9/2012 | Esenlik et al. | |
| 2012/0263231 A1 | 10/2012 | Zhou | |
| 2012/0320969 A1 | 12/2012 | Zheng et al. | |
| 2013/0188881 A1* | 7/2013 | Zhao | H04N 19/463 |
| | | | 382/232 |
| 2013/0272403 A1* | 10/2013 | Ramasubramonian et al. | 375/240.13 |
| 2014/0119712 A1* | 5/2014 | Jang et al. | 386/248 |
| 2014/0146895 A1* | 5/2014 | Xu et al. | 375/240.25 |
| 2014/0219332 A1* | 8/2014 | Yang | 375/240.02 |
| 2014/0301473 A1* | 10/2014 | Park et al. | 375/240.16 |

OTHER PUBLICATIONS

International Searching Authority, U.S. Patent and Trademark Office, Written Opinion for PCT/US2013/060236, mailed Jan. 29, 2014, 8 pages.

Martinian, E. et al, "Extensions of H.264/AVC for Multiview Video Compression," IEEE International Conference on Oct. 1, 2006, pp. 2981-2984, XPO31049303, ISBN: 978-1-4244-0480-3, Section 3, 4, figure 3.

Karczewicz, M. et al, "The SP- and SI-Frames Design for H.264/AVC," IEEE Transactions on Circuits and Systems for Viewo Technology, IEEE Service Center, Piscataway, NJ (US), vol. 13, No. 7, Jul. 1, 2003, pp. 637-644, XPO11099256, ISSN: 1051-8215, DOI: 10.1109/TCSVT.2003-814969—Abstract Sections I, II.

Chunbo Zhu, et al, "Error Resilient Video Coding Using Redundant Pictures," Image Processing, 2006 IEEE International Conference on Oct. 1, 2006, p. 801-804, XPO31048758, ISBN: 978-1-4244-0480-3—Abstract Section 3 and 4, figures 1 and 2.

Ngai-Man Cheung, et al, "Video Coding on Multicore Graphics Processors," IEEE Signal Processing Magazine, IEEE Service Center, Piscataway, NJ (US), vol. 27, No. 2, Mar. 1, 2010, pp. 79-89, XPO11306064, ISSN: 1053-5888.

Sullivan, Gary J., et al, "Overview of the High Efficiency Video Coding (HEVC) Standard," IEEE publication of Dec. 2012, 19 pages.

"Office Action Issued in European Patent Application No. 13776874.3", Mailed Date: Sep. 29, 2016, 5 Pages.

* cited by examiner

PICTURE REFERENCING CONTROL FOR VIDEO DECODING USING A GRAPHICS PROCESSOR

BACKGROUND

A video recording can be communicated and/or stored in digital form as encoded image data defining a sequence of displayable pictures for video playback. Some video encoding formats are defined by standards organizations to facilitate broad acceptance by industry and consumers (e.g., H.261, MPEG-1, H.262/MPEG-2, H.263, MPEG-4 Part 2, H.264/AVC, SMPTE VC-1, and H.265/HEVC). Video encoding typically includes a compression aspect that reduces the transmission and storage requirements associated with the video recording. For example, compressed video occupies less storage on a computing device and can be transferred (e.g., streamed) in a shorter period of time to/from the computing device. When the digital data is decoded, the data for each encoded picture in the coded video sequence is decoded to generate a displayable picture for presentation on a display, such as a computer screen, phone screen, or other display device.

In addition, a graphics processor is often used in combination with a host processor in a computing system to off-load certain processor-intensive decoding operations. The interaction between a host-processor-executed decoder and a graphics processor in decoding encoded image data can dramatically improve system performance. Such interaction can be dependent upon the standard used to encode the video and can itself be governed by a standardized interface.

Because normal playback is the most frequently used mode of operation in a video playback system, video encoding standards are often focused on a normal playback of video. As a result, other playback modes, which may be referred to as "trick play" operation (e.g., fast forward, reverse, skip ahead/forward seek, skip back/rewind, etc.) can present decoding challenges. For example, decoding for such a trick play operation may rely on video data that is not yet completely transferred, decoded, or otherwise available when that trick play mode is executed. Accordingly, the unavailable video data can lead to poor performance and/or poor picture quality during trick play operation.

SUMMARY

Implementations described and claimed herein address the foregoing problems by obtaining a first set of picture buffering parameters associated with a current picture of an encoded video bitstream. The first set of picture buffering parameters identifies a set of one or more reference pictures for use in decoding the current picture by a graphics processor. The video decoder revises the first set of picture buffering parameters into a second (different) set of picture buffering parameters for use in decoding the current picture by the graphics processor. The second set of picture buffering parameters is transferred to the graphics processor for decoding the current picture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
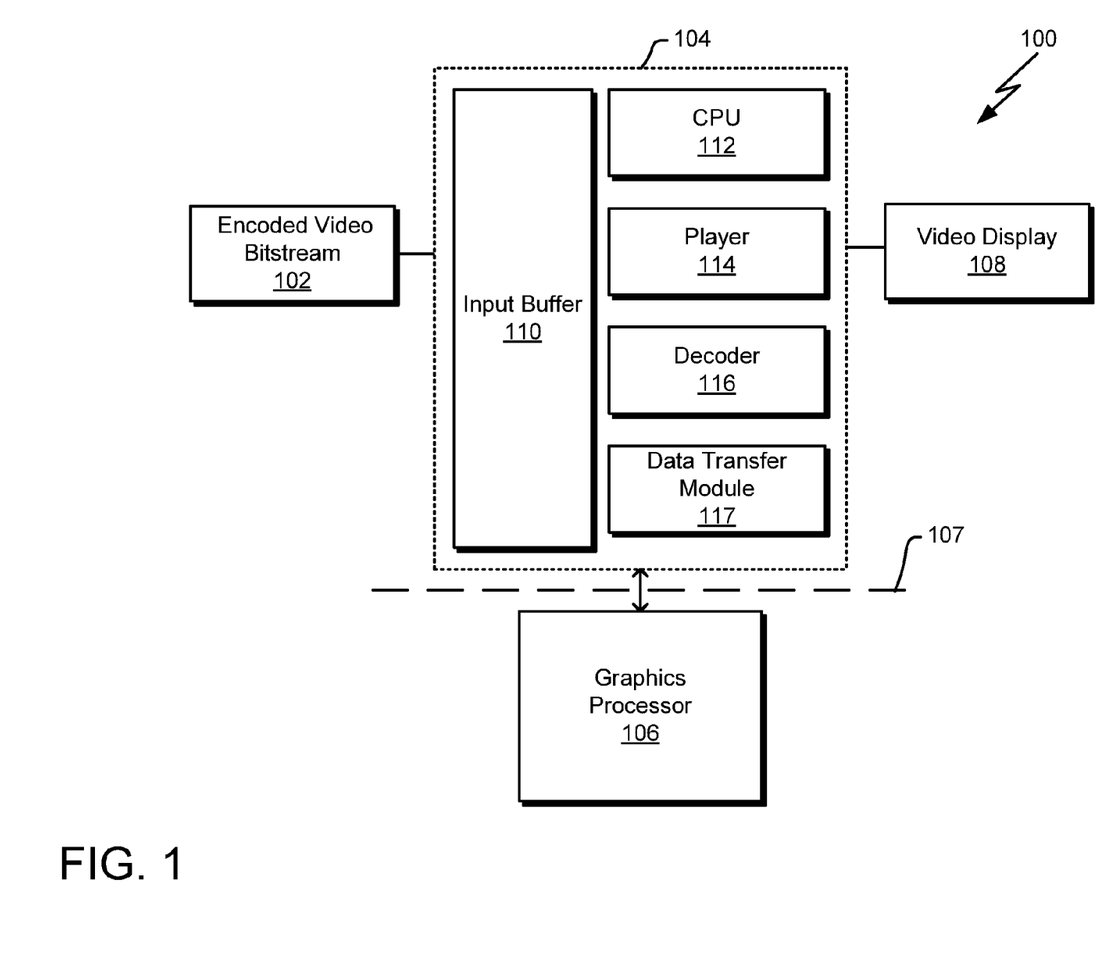
FIG. 1 illustrates an example of a video decoding system for a video playback device.

FIG. 1 illustrates an example of a video decoding system 100 for a video playback device. In this example, a received video data stream is referred to as an encoded video bitstream 102, which can be received from a variety of sources. For example, the video data stream might be received from a site located on the Internet, from one or more storage devices or services in the cloud, from a storage disk (such as a DVD), from a video teleconferencing system, from a television broadcasting system, from a remotely-located camera system, from memory that forms part of the same video playback device, etc.

A host processing device 104 receives the encoded video bitstream 102 from a video source (e.g., a Web-based video service) into an input buffer 110 (e.g., in memory). A player module 114 is executed by or in combination with a central processing unit (CPU) 112, an example of a host processor, and manages decoding of the encoded video bitstream 102 from the input buffer 110 and playback of the corresponding displayable pictures. Thus, the player 114 directs which encoded pictures of the encoded video bitstream 102 are decoded by a decoder 116 for playback purposes. In the example of FIG. 1, the player 114 can direct the decoder 116 to decode the encoded video bitstream data 102 for normal forward playback. In addition, the player 114 can direct the decoder 116 to decode the encoded video bitstream 102 for other types of playback, including without limitation playback involving concealment of data errors (e.g., data loss or corruption) and "trick play" operations (e.g., fast forward, reverse, skip to an arbitrary picture in the video picture sequence, etc.). A data transfer module 117 is used to transfer the encoded video bitstream 102 and other data from the host processing device 104 to a graphics processor 106. In the illustrated example, the interface between the data transfer module 117 and the graphics processor 106 is governed by a standardized interface 107, such as a device driver interface (DDI) or an application program interface (API).

The graphics processor 106 can be highly specialized to perform a specific function, such as the decoding a displayable picture of the encoded video bitstream 102 using a set of stored (or "buffered") reference pictures. In one implementation, each reference picture represents three arrays of samples constituting three color components (e.g., color components representing luminance, chrominance difference toward blue color, and chrominance difference toward red color) of an entire picture (e.g., every pixel for a given picture). Picture identification parameters, herein referred to as elements of a reference picture set, for use in the decoding of each encoded picture are identified in header data of the encoded video bitstream 102 (e.g., in picture-level or slice-level header data, where each slice corresponds to a distinct decodable region of a picture) and extracted by the decoder 116. In this example, a set of reference pictures are used by the graphics processor 106 to decode an encoded picture of the encoded video bitstream 102 and generate a picture that is displayable on a video display 108. When the services of the graphics processor 106 are invoked, the decoder 116 instructs the graphics processor 106 to decode the current encoded picture using an identified set of reference pictures.

Normal display order typically refers to the order in which video pictures of a coded video sequence would be displayed during normal forward playback. However, the order in which the encoded video pictures appear in the encoded video bitstream 102 may differ from the order in which the pictures are normally displayed on the video display. Picture ordering information within the encoded video bitstream 102 identifies any differences between the normal decoding order (also referred to as "bitstream order") and the normal output order (also referred to as "normal display order") for a decoder. During normal playback mode, the graphics processor 106 has access to stored copies (e.g., in buffer memory of the graphics processor 106) of all the reference pictures identified in the reference picture set for use in decoding the current picture in a timely manner.

However, during trick play operation, playback does not follow the normal playback sequence of displayable pictures, and so the previously-buffered reference pictures may not apply to the target picture of the trick play. For example, for a fast forward operation, the next picture of the fast forward sequence may be several pictures ahead of the current picture in the normal output order for the coded video sequence. As such, the previously buffered reference pictures may not apply to the next picture of the fast forward operation, and some of the reference pictures associated with the next picture of the fast forward operation may not be available for use in decoding the next picture (because they were skipped during the fast forward operation). As such, the decoder 116 may revise the reference picture set associated with decoding the next picture to ignore the unavailable reference pictures. Such revision of the reference picture set may be employed for other types of trick plays, including fast forward, smooth reverse, channel acquisition, random seek, etc.

In particular, for trick plays in which operation is switched to a new data stream or an arbitrary location in a video picture sequence, such as channel acquisition and random seek, the previously buffered pictures may have little or no relationship to the reference picture set for the new target picture for the trick play. Accordingly, revision of the reference picture set for the new target picture can allow faster decoding of the new target picture, for example, by omitting reference pictures that impose a long decoding time (e.g., omitting reference pictures that require prior decoding of many unbuffered reference pictures).

Such revision of the reference picture set may also be employed to conceal errors (e.g., such as lost data) in the encoded video bitstream 102. For example, if the decoder 116 detects that a reference picture that would ordinarily be used for decoding a current picture has been lost, the decoder 116 can remove the lost reference picture from the reference picture set of the current picture, such as by replacing the lost reference picture with a different, available reference picture for use in decoding the current picture.

In yet another implementation, computing resources (e.g., video decoder resources, graphics processor resources, etc.) and/or communication bandwidth may cause the playback to fall behind or to risk falling behind. In such scenarios, the decoder may decide to simplify the decoding of sequences of pictures using the described techniques (e.g., skipping the decoding of certain pictures, omitting certain reference pictures from the decoding of each picture in the sequence, etc., thus speeding up the decoding to allow playback to catch up to or keep up with, for example, an audio stream). Likewise, the decoder may omit certain pictures from its data delivery requests to a video server that provides the video bitstream. Such pictures therefore may be omitted as reference pictures for certain pictures in the video sequence.

As discussed, the host processing device 104 can address such operational modes by directing the graphics processor 106 to utilize a different set of reference pictures when decoding the current picture. Thus, a picture that would ordinarily be decoded using a first set of buffered reference pictures during normal playback can be decoded using a different set (e.g., a subset) of reference pictures during a trick play or error concealment operation. The revised set of reference pictures can specify reference pictures that the graphics processor 106 has buffered already or which can be quickly decoded from available pictures. Accordingly, the current picture can itself be quickly decoded from these already-buffered or quickly decoded reference pictures. Once a current picture is decoded, generating a displayable picture, the host processing device 104 sends the decoded displayable picture to the video display 108 for presentation (e.g., display) to a user.

Figure 2:
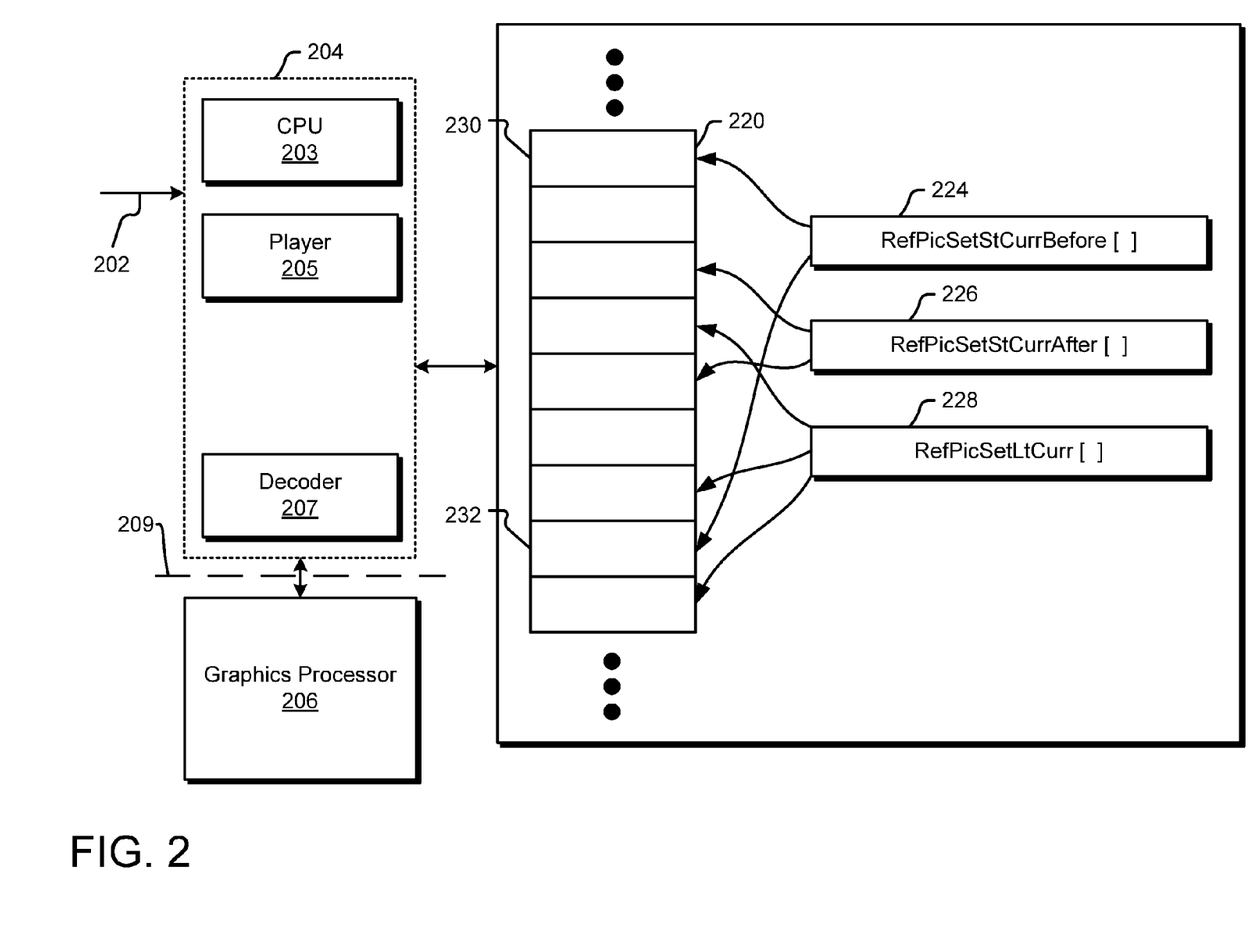
FIG. 2 illustrates an example host processing device using picture buffering parameters to decode an encoded picture from an encoded video bitstream received at an input channel.

FIG. 2 illustrates an example host processing device 204 using picture buffering parameters to decode an encoded picture from an encoded video bitstream received at an input channel 202. The host processing device 204 receives the encoded video bitstream and utilizes a CPU 203, a player 205, and a decoder 207 to process the encoded video bitstream. A graphics processor 206 is utilized for specialized graphics processing to assist in the decoding of the encoded video bitstream.

The decoder 207 specifies the set of reference pictures to be used by the graphics processor 206 to decode an encoded picture to generate a displayable picture. For example, according to various video standards, typical types of encoded pictures may be referred to as I pictures, P pictures, and B pictures. Each displayable picture can be decoded from one of these encoded pictures. Reference pictures are not used to decode an I picture, but one or more reference pictures are used to decode a P picture or a B picture. For example, if a movie contains a scene with a bird flying across a blue sky, the vast majority of the video content remains the same from one displayed picture to the next. The primary change is the position of the bird as it moves across the sky. Thus, rather than sending an entirely new set of video data for each encoded P picture or B picture, video encoding reuses image data from other pictures—e.g., previously encoded pictures—to encode subsequent displayable pictures. In the bird/sky example, the blue sky does not change—so portions of previously decoded pictures corresponding to the blue sky regions can be reused to decode subsequently decoded P pictures and B pictures. This approach reduces the amount of data that is downloaded to the host processing device 204 as well as the amount of data that is encoded and decoded.

As an illustration of this decoding scheme, FIG. 2 shows an array of data designated as a reference picture set 220 for a current picture. The reference picture set 220 may designate the one or more reference pictures for decoding the current picture and any subsequent pictures in decoding order for the coded video sequence (e.g., when performing the decoding process for normal video playback). Accordingly, the reference picture set 220 may identify to the graphics processor 206 the decoded reference pictures that are to be buffered for decoding the current picture and any subsequent pictures in the normal decoding order. The operation of the decoding process by the decoder 207 and/or the graphics processor 206 for decoding each current picture depends on the encoded data for each picture, and may depend on information about picture ordering and timing, as well as classification of whether reference pictures used in the decoding process are identified in the bitstream data as short-term reference pictures or as long-term reference pictures. The decoding process for the current picture may depend on whether the reference pictures used in the decoding process are identified in the bitstream data as short-term reference pictures or as long-term reference pictures, for example, with regard to the way the reference pictures are identified in the picture buffering parameters or with regard to the way motion vector data associated with the reference pictures are used. For example, the way that the identification of a picture as a short-term reference picture or long-term reference picture affects the encoded bitstream data format and the decoding process may be as specified in the H.264/AVC standard, as specified in the H.265/HEVC standard, or as used in other video coding techniques.

In the illustrated example, each entry in the reference picture set 220 is indexed to allow a particular entry to be referenced by other parameters. In FIG. 2, three picture buffering parameters, RefPicSetStCurrBefore[ ], RefPicSetStCurrAfter[ ], and RefPicSetLtCurr[ ] are defined to specify the reference pictures in the reference picture set 220 that are to be used to decode the current picture. The reference picture set 220 may also contain additional entries (not shown in FIG. 2) that are not included in these three picture buffering parameters (e.g., to identify pictures in the reference picture set that are not used to decode the current picture but may be used to decode some other subsequent pictures. The three illustrated picture buffering parameters in the example are described in further detail as follows:

RefPicSetStCurrBefore[ ]—a picture buffering parameter specifying zero or more pictures that precede the current picture in the normal display order that are to be used as short-term reference pictures in the decoding process for the current encoded picture in a coded video sequence RefPicSetStCurrAfter[ ]—a picture buffering parameter specifying zero or more pictures that follow the current picture in the normal display order that are to be used as short-term reference pictures in the decoding process for the current encoded picture in a coded video sequence RefPicSetLtCurr[ ]—a picture buffering parameter specifying zero or more pictures that are to be used as long-term reference pictures in the decoding process for the current encoded picture in a coded video sequence These picture buffering parameters are indicated as arrays 224, 226, and 228, respectively. Each of these parameters holds one or more indices designating particular reference entries in the reference picture set 220. The decoder 207 passes such parameters to the graphics processor 206 (e.g., through a DDI 209) for each encoded picture that is to be decoded so that the graphics processor 206 can identify the reference pictures to use to decode the current encoded picture. The reference pictures specified by these picture buffering parameters (arrays 224, 226, and 228) for the current encoded picture are referred to as the current part of the reference picture set. A current part of the reference picture set identifies a set of reference pictures associated with the current picture (not subsequent pictures) and includes all reference pictures that are prior to the associated picture in decoding order, that may be used for inter-picture prediction of the current picture. In addition to containing the current part of the reference picture set, the reference picture set 220 may contain additional entries that do not pertain to the current picture (e.g., such entries may pertain to subsequent pictures in decoding order).

In FIG. 2, the three illustrated picture buffering parameters (arrays 224, 226, and 228) reference appropriate entries in the reference picture set 220. For example, the RefPicSetStCurrBefore[ ] array 224 references entries 230 and 232 in the reference picture set 220. The data associated with each entry in the illustrated picture buffering parameters (arrays 224, 226, and 228) may include some additional associated data, such as picture ordering position data, picture timing data, etc., in addition to the identification of the corresponding entry in the reference picture set 220. The data associated with each entry in the reference picture set 220 may also include some additional associated data in addition to the identification of the picture associated with the entry in the reference picture set 220. In an alternative implementation, the data associated with the picture buffering parameters may directly identify the reference pictures, rather than identifying them indirectly via the reference picture set 220.

As discussed with regard to FIG. 1, picture buffering parameters may be extracted from slice headers of each encoded picture in the encoded video bitstream. However, in certain circumstances (e.g., trick play operation, error concealment operation, etc.), the decoder 207 can alter the picture buffering parameters before passing them to the graphics processor 206. Such alterations may include without limitation replacing a reference to one reference picture (in the reference picture set for the current picture) with a reference to a different reference picture. In one implementation, the altered reference picture set may include a duplicate reference to a reference picture already identified in the reference picture set. In another implementation, the replacement reference picture may be a different reference picture already buffered by the graphics processor. In yet another implementation, the replacement reference picture may correspond to an encoded picture that may be more quickly decoded by the graphics processor (e.g., from readily available encoded picture data and/or buffered reference pictures) than the reference picture identified in the original, unaltered reference picture set.

Figure 3:
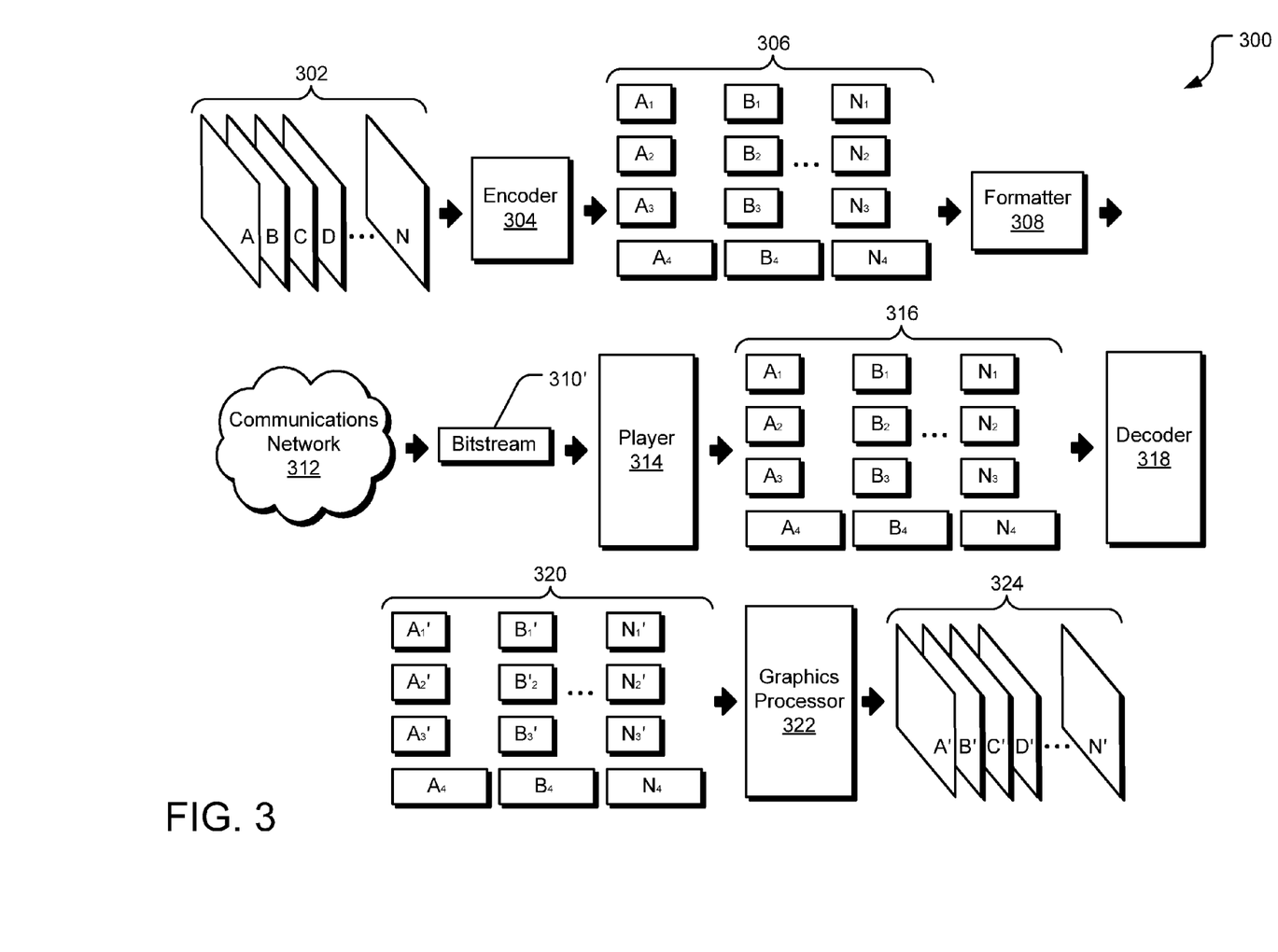
FIG. 3 illustrates an example of an encoding/decoding process and the generation of revised parameters for use during a trick play mode.

FIG. 3 illustrates an example of an encoding/decoding process 300. The illustrated process generates revised picture buffering parameters for use during a trick play operation. A similar process could generate revised picture buffering parameters for use during an error concealment operation or some other playback operation. A recording device, such as a video camera, captures an initial sequence of pictures 302. The initial sequence of pictures is saved in a computer memory buffer and input into an encoder 304 that converts the captured video data to an encoded format, as illustrated by the data sets 306 for pictures A-N. For example, the set of data $A_1$, $A_2$, and $A_3$ illustrates a set of three picture buffering parameters and $A_4$ illustrates underlying image data and other decoding parameters that can be used to decode encoded picture A. The three picture buffering parameters $A_1$, $A_2$, and $A_3$ represent the three picture buffering parameters that specify a reference picture set for picture A. It should be understood that other picture buffering parameters (not shown) and other data may be used in the encoding and decoding of individual video images. A formatter 308 is used to form an encoded video bitstream 310 that can be transmitted across a communications network 312. It should be understood that the encoded video bitstream 210 may also stored and/or transmitted via other means.

A host processing system receives the encoded video bitstream 310' from the communications network 312. A player 314 of the host processing system extracts the original sets of data 316, including the picture buffering parameters, from the slice headers of the encoded video bitstream 310'. During normal playback mode, the original sets of data 316 (e.g., picture buffering parameters $A_1$, $A_2$, $A_3$ and other data $A_4$) are passed through an interface to a graphics processor for decoding of a corresponding encoded picture to generate the pictures A, B, . . . N for display. However, during trick play mode, the decoder 318 can modify the original sets of data $A_1$, $A_2$, $A_3$, for example, to create new picture buffering parameters (e.g., $A'_1$, $A'_2$, $A'_3$). (It should be understood that one or more of the picture buffering parameters may be revised, depending on the playback executed by the player 314—not all of the picture buffering parameters need be modified. These one or more revised picture buffering parameters, along with other data (e.g., $A_4$), are supplied by the decoder 318 through an interface to the graphics processor 322 to produce slightly (or even substantially) different decoded pictures A', B', C', D' . . . N'. The sequence A', B', C', D' . . . N' represents, for example, a revised set of pictures 324 displayed during a fast forward trick play operation.

Figure 4:
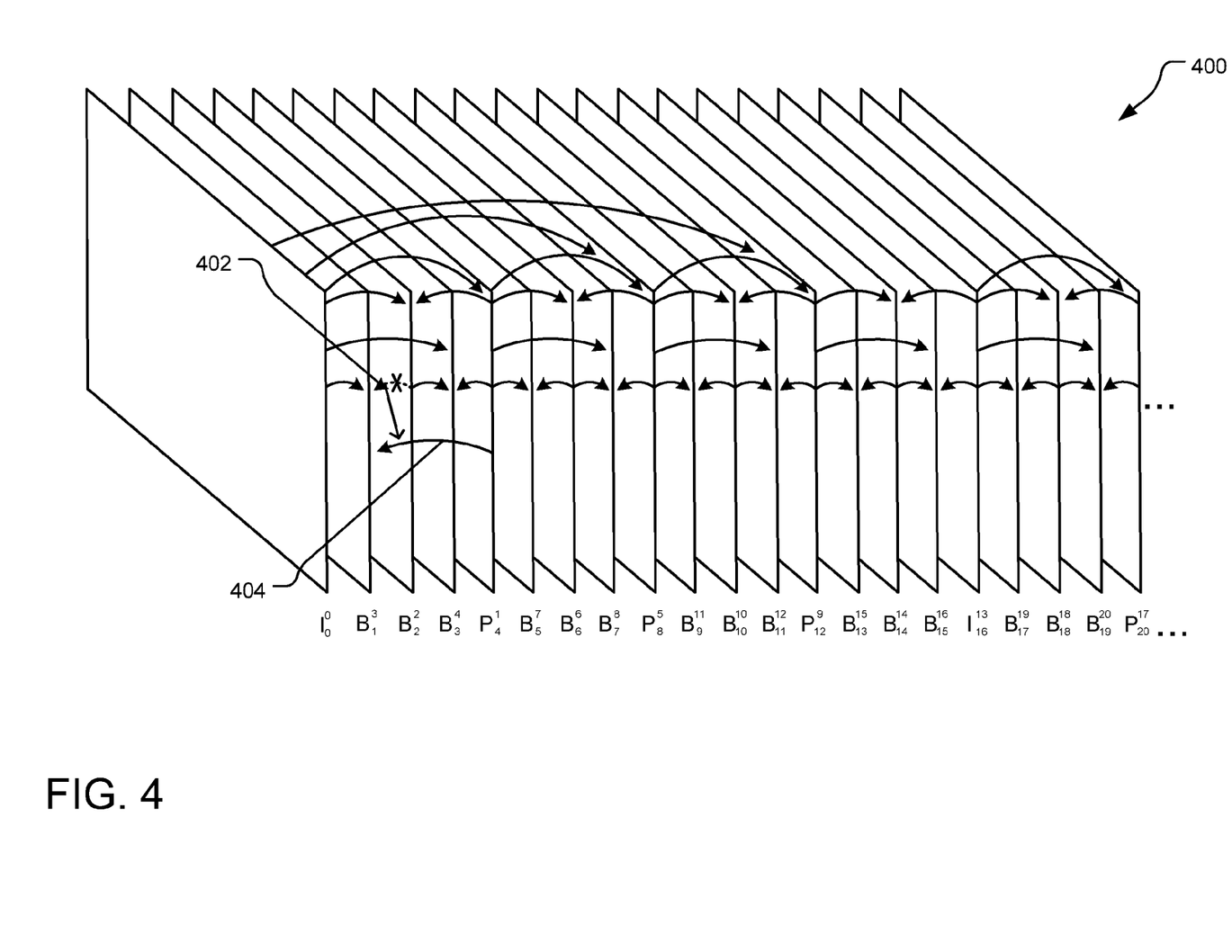
FIG. 4 illustrates an example sequence of encoded pictures that can be used to construct a series of displayable pictures.

FIG. 4 illustrates an example sequence 400 of encoded pictures that can be used to construct a series of displayable pictures, many of which may be reference pictures. Each picture that is eventually displayed on the video display can be constructed from a decoded picture and a set of zero or more reference pictures using a technique referred to as inter-picture prediction. The arrows in FIG. 4 indicate which other pictures are used to decode the current encoded picture to generate a displayable picture for each particular picture that is pointed to by the arrows. FIG. 4 shows I, P, and B pictures. The I pictures are decodable by themselves without the use of inter-picture prediction to generate the corresponding displayable picture. Thus, no arrows point to the I pictures in FIG. 4. In contrast, the P and B pictures do use inter-picture prediction references. Therefore, various arrows point to such P and B pictures in FIG. 4.

In FIG. 4, each picture is designated by an I, a P, or a B, according to its picture type. Moreover, when each picture is decoded using reference pictures corresponding to the pictures that have arrows that point to that particular picture, a displayable picture is generated. The superscript for each I, P, or B indicates the normal decoding order for the series of pictures as they are decoded serially from the encoded video bitstream. The subscript for each I, P, or B indicates the display order of the pictures that are decoded from each encoded picture during normal playback mode (i.e., the normal display order). Thus, for example, picture $P_4^1$ is the first picture decoded after $I_0^0$ and is used to produce the fourth picture displayed after the picture constructed from $I_0^0$.

As noted earlier, a reference picture set specifies the list of one or more reference pictures that are used to decode a current picture and possibly all subsequent pictures in a coded video sequence in decoding order. Accordingly, the pictures specified in the reference picture set are buffered for use in decoding the current picture and subsequent pictures. In the illustrated example of FIG. 4, the content of the reference picture set for the first 20 pictures in normal forward playback is as follows. For simplification, only the entries in the reference pictures set that are used to decode the corresponding current picture, referred to as the "current part of the reference picture set," are described in the listing below. Each P or B picture is decoded using references to other pictures (I, P, or B pictures) that are used as reference pictures for inter-picture prediction for the P or B picture.

For picture $I_0^0$, there are no pictures in the current part of the reference picture set, as $I_0^0$ is an I picture and thus does not use any inter-picture prediction references.
For picture $P_4^1$, the current part of the reference picture set includes $\{I_0^0\}$.
For picture $B_2^2$, the current part of the reference picture set includes $\{I_0^0, P_4^1\}$.
For picture $B_1^3$, the current part of the reference picture set includes $\{I_0^0, B_2^2\}$.
For picture $B_3^4$, the current part of the reference picture set includes $\{I_0^0, P_4^1, B_2^2\}$.
For picture $P_8^5$, the current part of the reference picture set includes $\{I_0^0, P_4^1\}$.
For picture $B_6^6$, the current part of the reference picture set includes $\{P_4^1, P_8^5\}$.
For picture $B_5^7$, the current part of the reference picture set includes $\{P_4^1, B_6^6\}$.
For picture $B_7^8$, the current part of the reference picture set includes $\{P_4^1, P_8^5, B_6^6\}$.
For picture $P_{12}^9$, the current part of the reference picture set includes $\{I_0^0, P_8^5\}$.
For picture $B_{10}^{10}$, the current part of the reference picture set includes $\{P_8^5, P_{12}^9\}$.
For picture $B_9^{11}$, the current part of the reference picture set includes $\{P_8^5, B_{10}^{10}\}$.
For picture $B_{11}^{12}$, the current part of the reference picture set includes $\{P_8^5, B_{10}^{10}, P_{12}^9\}$.
For picture $I_{16}^{13}$, there are no pictures in the current part of the reference picture set, as $I_{16}^{13}$ is an I picture and thus does not use any inter-picture prediction references.
For picture $B_{14}^{14}$, the current part of the reference picture set includes $\{P_{12}^9, I_{16}^{13}\}$.
For picture $B_{13}^{15}$, the current part of the reference picture set includes $\{P_{12}^9, B_{14}^{14}\}$.
For picture $B_{15}^{16}$, the current part of the reference picture set includes $\{P_{12}^9, I_{16}^{13}, B_{14}^{14}\}$.
For picture $P_{20}^{17}$, the current part of the reference picture set includes $\{I_{16}^{13}\}$.
For picture $B_{18}^{18}$, the current part of the reference picture set includes $\{I_{16}^{13}, P_{20}^{17}\}$.
For picture $B_{17}^{19}$, the current part of the reference picture set includes $\{I_{16}^{13}, B_{18}^{18}\}$.
For picture $B_{19}^{20}$, the current part of the reference picture set includes $\{I_{16}^{13}, P_{20}^{17}, B_{18}^{18}\}$.

When a trick play operation is performed by a video player system, such as a host processing device, some of the reference pictures associated with a current picture may not currently be readily available as buffered decoded pictures—because they were never decoded, because they were previously decoded but are no longer buffered (e.g., because of buffering capacity limitations), etc. Thus, in one implementation, it is expedient to avoid some retransmission and re-decoding of some reference pictures that are specified in the encoded video bitstream for decoding a particular encoded picture. For example, if a decoder instructs the graphics processor to decode the encoded picture $B_1^3$, the normal playback decoding process uses reference pictures $I_0^0$ and $B_2^2$, specified in the current reference picture set for $B_1^3$, to decode picture $B_1^3$. Moreover, because $B_2^2$ relies upon $P_4^1$, $P_4^1$ would also be decoded so that $B_2^2$ can be decoded. In contrast, during trick play mode, a reference picture for $B_2^2$ may no longer be buffered, so the decoder could elect to skip the decoding of $B_2^2$ and replace $B_2^2$'s reference position in the reference picture set of $B_1^3$ with a reference to $P_4^1$. FIG. 4 depicts the replacement of the reference picture $B_2^2$ (illustrated by dashed arrow 402) with a reference to $P_4^1$ (illustrated by solid arrow 404). In other words, For picture $B_1^3$, the reference picture set is revised to include $\{I_0^0, P_4^1\}$, omitting the reference to $B_2^2$.

If access to $B_7^8$ is indicated, perfect reconstruction would involve first decoding the pictures in the reference picture set for $B_7^8$. Thus, $I_0^0$, then $P_4^1$, then $P_8^5$, then $B_6^6$, and then $B_7^8$ would be decoded to achieve a perfect reconstruction of $B_7^8$. During trick play mode, a host player could elect to skip the decoding of some of those pictures—for example by replacing $B_6^6$ with a reference to $P_4^1$ or $P_8^5$ when accessing $B_7^8$, or perhaps by replacing references to both $P_8^5$ and $B_6^6$ with references to $P_4^1$.

Another tactic that can be applied for trick play situations is to simply substitute a different picture for the desired target picture. For example, if the player is performing a fast forward operation and the ideal target picture to decode would be the picture $B_{15}^{16}$, the decoder may instead direct the graphics processor to decode and display the substitute picture $I_{16}^{13}$. The picture $I_{16}^{13}$ is a stand-alone picture—thus, implicit in this example is that no additional reference pictures would then need to be decoded. Thus, careful substitution of targeted pictures to be displayed can be a time saving technique.

A combination of substituting an alternative picture in place of an initially targeted picture can also be implemented. Thus, if the ideal target picture to access would be the picture $B_{13}^{15}$, the host processor might substitute the picture $P_{12}^9$ in place of the picture $B_{13}^{15}$. Furthermore, the host processor might simplify the decoding of the alternative target picture by altering the set of pictures used as reference pictures for decoding $P_{12}^9$ (e.g., skipping the decoding of $P_8^5$ and instead substituting a reference to $P_4^1$ in place of the reference to $P_8^5$). This simplification can be implemented recursively for reference pictures used in decoding the reference pictures for the target picture, etc.

The above examples illustrate how substituted data can be utilized during a trick play fast forward operation. Other trick play modes may be utilized as well. For example, during random-access-seek, the host processing system may move to the position in the video bitstream randomly selected by the user. This will often result in positioning the player at a random spot in the video bitstream. As a result, there may be insufficient buffered data to allow precise picture depictions as playback begins. So, rather than delaying the playback until all the data can be decoded, the host processing system can substitute some pictures that have already been decoded (or will be decoded first) in place of pictures that will be decoded later. This will allow a picture to be decoded and displayed more quickly—even if the displayed picture is not precisely the same as the picture that would be displayed if the normal decoding process had been followed for the target picture. As playback continues, the host processing system can catch up so that modification is no longer utilized.

The trick play operations of reverse play and fast rewind can be implemented similar to fast forward play described above. The host processor can select pictures to play in reverse, but the reference pictures for the selected reverse-play pictures may not be immediately (or quickly) available. The memory capacity requirements for reverse play decoding can be especially challenging and may involve discarding some pictures from memory after decoding them. So, the host processor can substitute pictures within the reference picture set in order to allow the graphics processor to generate a picture more quickly. The generated picture can then be displayed on the video display as part of a series of pictures for reverse play or fast rewind.

A similar process can also be utilized for error concealment. When data for a picture is determined to be lost or corrupted, another picture can be displayed as a substitute for that picture, and the reference picture set for other pictures that use that picture as a reference picture for inter-picture prediction can be appropriately modified to account for this substitution. Thus, even during normal playback operation, a revised reference picture set can be used to provide a modified picture in place of a lost or corrupted picture.

Figure 5:
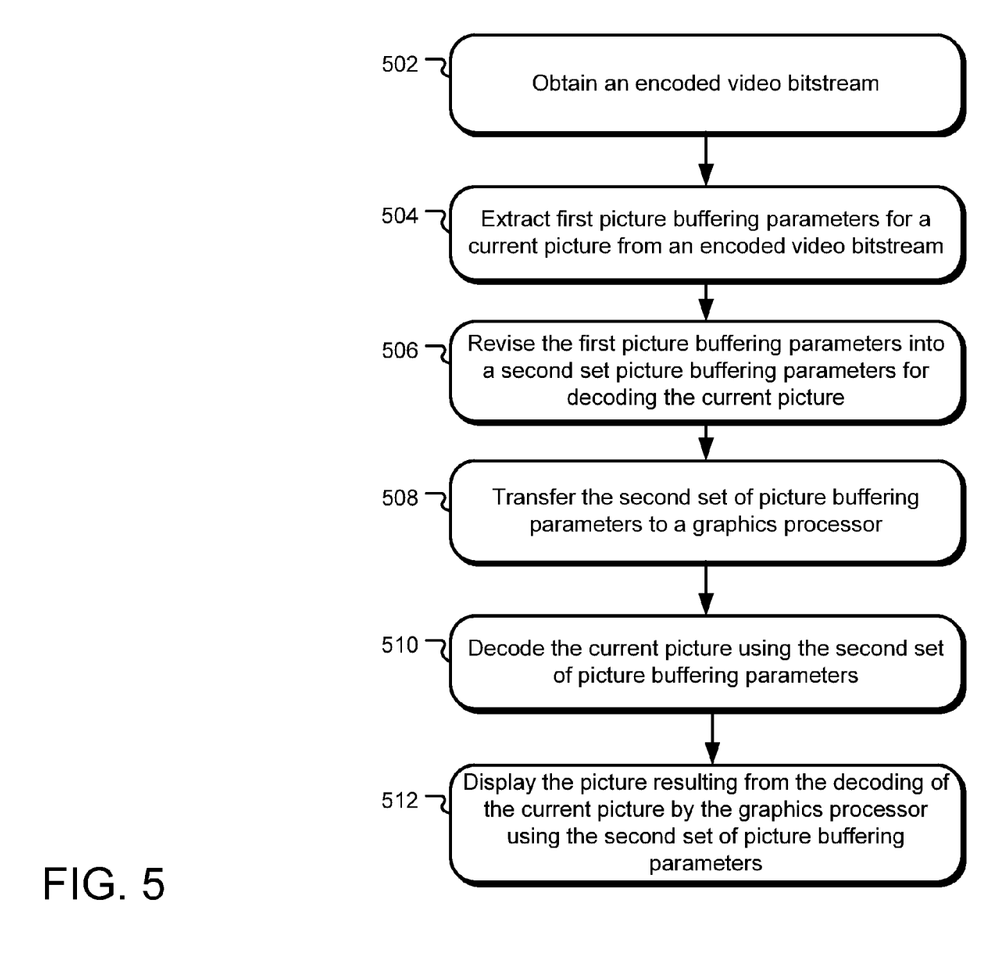
FIG. 5 illustrates example process for video trick play operation.

FIG. 5 illustrates example operations for decoding a picture using a modified set of picture buffering parameters. A receiving operation 502 obtains an encoded video bitstream. The encoded video bitstream could be obtained directly as part of a download operation from an external network or obtained in some other manner. For example, the encoded video bitstream might be received from a computer memory associated with a video player.

An extraction operation 504 extracts a first set of picture buffering parameters from the encoded video bitstream. When trick play mode is invoked, the first set of picture buffering parameters can be revised to facilitate a more efficient trick play operation. A modification operation 506 revises the first set of picture buffering parameters into a second set of picture buffering parameters for decoding the encoded picture. The second set of picture buffering parameters is inconsistent (e.g., does not match) with the picture buffering parameters that can be obtained from the encoded video bitstream in associated with the current picture.

A transfer operation 508 transfers the second set of picture buffering parameters to a graphic processor. A decoding operation 510 decodes the current picture using the second set of picture buffering parameters via a graphics processor. A display operation 512 displays the picture resulting from the decoding of the current picture by the graphics processor using the second set of picture buffering parameters.

Figure 6:
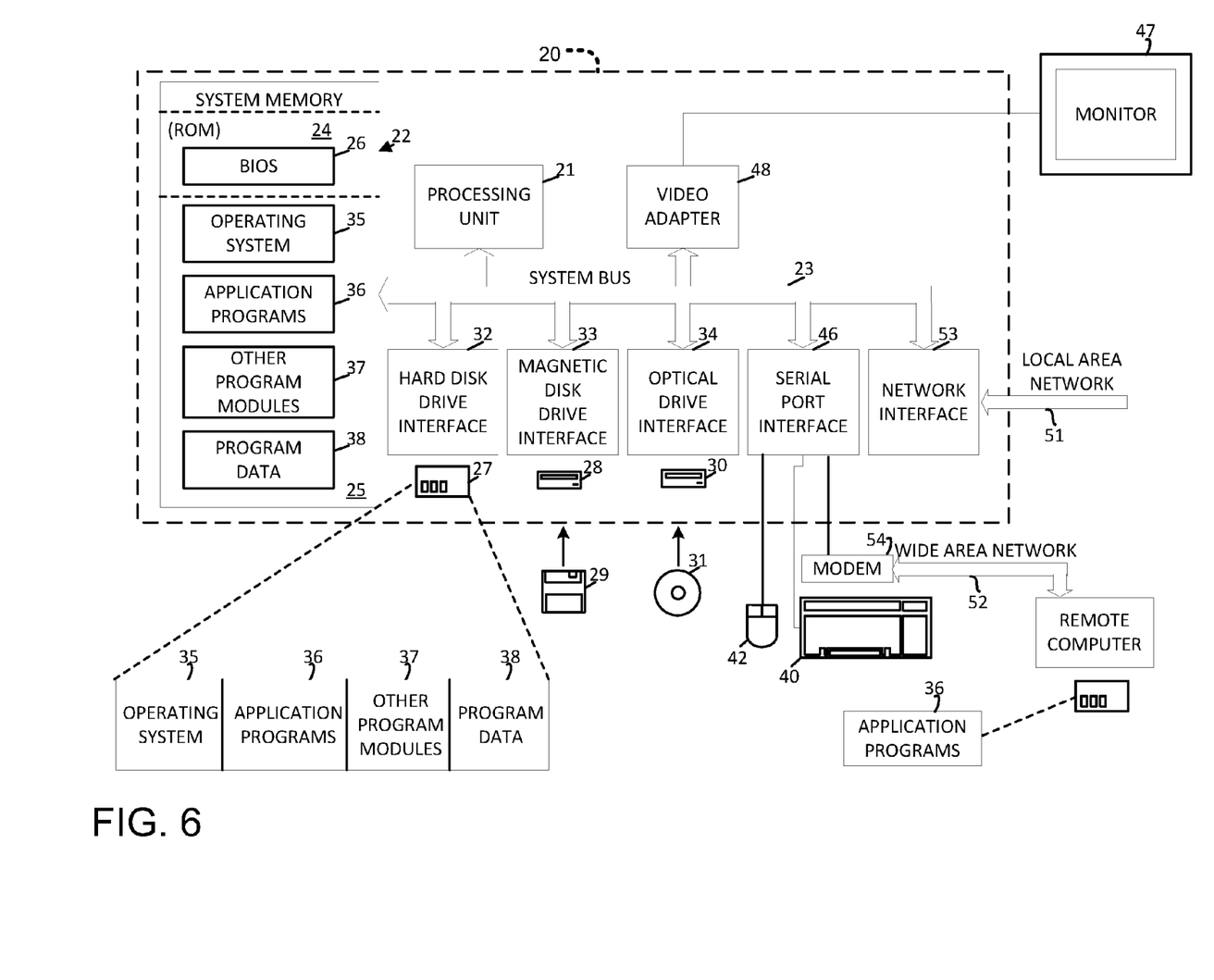
FIG. 6 illustrates an example system that may be useful in implementing the described technology.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units (such as a graphics processor), commonly referred to as a parallel processing environment. The computer 20 may be a conventional computer, a distributed computer, or any other type of computer; the implementations are not so limited. In particular, a graphics processor may include any architectural element that performs all or part of the decoding process for a video picture using a reference picture set in an off-loaded capacity for one or more host processors.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, a touchpad (e.g., for gesture or touch input) or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a video player, a decoder, a data transfer module, picture buffering parameters, encoded pictures, reference pictures, displayable pictures, and other data may be stored in memory 22 and/or storage devices 29 or 31 and processed by the processing unit 21. The picture buffering parameters, encoded pictures, reference pictures, displayable pictures and other data may be stored in memory 22 and/or storage devices 29 or 31 as persistent datastores.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (APIs), device driver interfaces (DDIs), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
   obtaining a first set of picture buffering parameters associated with a current picture of an encoded video bitstream, the first set of picture buffering parameters identifying a set of one or more reference pictures for use in decoding the current picture by a graphics processor during normal playback, the graphics processor having a buffer memory for storing reference pictures;
   receiving the set of one or more reference pictures in the buffer memory;
   revising the first set of picture buffering parameters into a second set of picture buffering parameters for use in decoding the current picture by the graphics processor, the second set of picture buffering parameters identifying a different set of one or more reference pictures than the first set of picture buffering parameters, the different set of one or more reference pictures including at least one reference picture not currently stored in the buffer memory of the graphics processor, the set of one or more reference pictures in the buffer memory being sufficient to decode the at least one reference picture not currently stored in the buffer memory; and
   transferring the second set of picture buffering parameters to the graphics processor for decoding the current picture.

2. The method of claim 1 wherein obtaining the first set of picture buffering parameters comprises:
   receiving the encoded video bitstream at a decoder; and
   extracting the first set of picture buffering parameters from the encoded video bitstream.

3. The method of claim 1 wherein revising the first set of picture buffering parameters comprises:
   replacing the first set of picture buffering parameters indicated to be used for decoding the entire current picture with the second set of picture buffering parameters indicated to be used for decoding the entire current picture.

4. The method of claim 1 wherein each of the first set of picture buffering parameters and the second set of picture buffering parameters includes a reference picture set.

5. The method of claim 1 wherein each of the first set of picture buffering parameters and the second set of picture buffering parameters includes a picture buffering parameter referencing at least one entry in a reference picture set, the at least one entry identifying a picture that precedes the current picture in normal display order and is used as a short-term reference picture in the decoding process for the current picture.

6. The method of claim 1 wherein each of the first set of picture buffering parameters and the second set of picture buffering parameters includes a picture buffering parameter referencing at least one entry in a reference picture set, the at least one entry identifying a picture that follows the current picture in normal display order and is used as a short-term reference picture in the decoding process for the current picture.

7. The method of claim 1 wherein each of the first set of picture buffering parameters and the second set of picture buffering parameters includes a picture buffering parameter referencing at least one entry in a reference picture set, the at least one entry identifying a picture is used as a long-term reference picture in the decoding process for the current picture.

8. The method of claim 1 wherein the second set of picture buffering parameters is inconsistent with a corresponding set of picture buffering parameters obtainable from the encoded video bitstream by the graphics processor.

9. One or more computer-readable storage devices encoding computer-executable instructions for executing on a computer system a computer process, the computer process comprising:
   obtaining a first set of picture buffering parameters associated with a current picture of an encoded video bitstream, the first set of picture buffering parameters identifying a set of one or more reference pictures for use in decoding the current picture by a graphics processor during normal playback, the graphics processor having a buffer memory for storing reference pictures;
   receiving the set of one or more reference pictures in the buffer memory;
   revising the first set of picture buffering parameters into a second set of picture buffering parameters for use in decoding the current picture by the graphics processor, the second set of picture buffering parameters identifying a different set of one or more reference pictures than the first set of picture buffering parameters, the different set of one or more reference pictures including at least one reference picture not currently stored in the buffer memory of the graphics processor, the set of one or more reference pictures in the buffer memory being sufficient to decode the at least one reference picture not currently stored in the buffer memory; and
   transferring the second set of picture buffering parameters to the graphics processor for decoding the current picture.

10. The one or more computer-readable storage devices of claim 9 wherein obtaining the first set of picture buffering parameters comprises:
    receiving the encoded video bitstream at a decoder; and
    extracting a first picture buffering parameter defined to reference short-term reference pictures for the current picture that follow the current picture in normal display order;
    extracting a second picture buffering parameter defined to reference short-term reference pictures for the current picture that precede the current picture in normal display order; and extracting a third picture buffering parameter defined to reference long-term reference pictures for the current picture.

11. The one or more computer-readable storage devices of claim 10 wherein revising the first set of picture buffering parameters comprises:
    revising at least one of the first picture buffering parameter, the second picture buffering parameter, or the third picture buffering parameter, prior to the transferring operation.

12. The one or more computer-readable storage devices of claim 9 wherein each of the first set of picture buffering parameters and the second set of picture buffering parameters includes a reference picture set.

13. The one or more computer-readable storage devices of claim 9 wherein each of the first set of picture buffering parameters and the second set of picture buffering parameters includes a picture buffering parameter referencing at least one entry in a reference picture set for use in decoding the current picture, the entry representing a long-term reference picture.

14. The one or more computer-readable storage devices of claim 9 wherein each of the first set of picture buffering parameters and the second set of picture buffering parameters includes a picture buffering parameter referencing at least one entry in a reference picture set for use in decoding the current picture, the entry representing a short-term reference picture.

15. The one or more computer-readable storage devices of claim 9 wherein the second set of picture buffering parameters is inconsistent with a corresponding set of picture buffering parameters obtainable from the encoded video bitstream by the graphics processor.

16. A system comprising:
    a decoder that obtains a first set of picture buffering parameters associated with a current picture of an encoded video bitstream, the first set of picture buffering parameters identifying a set of one or more reference pictures for use in decoding the current picture by a graphics processor during normal playback, and revises the first set of picture buffering parameters into a second set of picture buffering parameters for use in decoding the current picture by the graphics processor, the graphics processor storing the set of one or more reference pictures in a buffer memory, the second set of picture buffering parameters identifying a different set of one or more reference pictures than the first set of picture buffering parameters, the different set of one or more reference pictures including at least one reference picture not currently stored in the buffer memory of the graphics processor, the set of one or more reference pictures in the buffer memory being sufficient to decode the at least one reference picture not currently stored in the buffer memory; and
    a data transfer module that transfers the second set of picture buffering parameters to the graphics processor for decoding the current picture.

17. The system of claim 16 wherein each of the first set of picture buffering parameters and the second set of picture buffering parameters includes a reference picture set.

18. The system of claim 16 wherein each of the first set of picture buffering parameters and the second set of picture buffering parameters includes a picture buffering parameter referencing at least one entry in a reference picture set for use in decoding the current picture, the entry representing a long-term reference picture.

19. The system of claim 16 wherein each of the first set of picture buffering parameters and the second set of picture buffering parameters includes a picture buffering parameter referencing at least one entry in a reference picture set for use in decoding the current picture, the entry representing a short-term reference picture.

20. The system of claim 16 wherein the second set of picture buffering parameters is inconsistent with a corresponding set of picture buffering parameters obtainable from the encoded video bitstream by the graphics processor.

* * * * *